US011341546B2

(12) United States Patent
Rabinowitz et al.

(10) Patent No.: US 11,341,546 B2
(45) Date of Patent: May 24, 2022

(54) BID TOOL OPTIMIZATION

(71) Applicant: Clover Health, Jersey City, NJ (US)

(72) Inventors: Judah Rabinowitz, Jersey City, NJ (US); Alec Clowes, San Francisco, CA (US); Brian Johnson, San Francisco, CA (US); Jonathan Shih, San Francisco, CA (US)

(73) Assignee: Clover Health, Jersey City, NJ (US)

( * ) Notice: Subject to any disclaimer, the term of this patent is extended or adjusted under 35 U.S.C. 154(b) by 711 days.

(21) Appl. No.: 16/224,188

(22) Filed: Dec. 18, 2018

(65) Prior Publication Data

US 2020/0193489 A1   Jun. 18, 2020

(51) Int. Cl.
*G06Q 10/10* (2012.01)
*G06Q 30/02* (2012.01)
*G06Q 30/08* (2012.01)
*G06N 20/00* (2019.01)
*G06Q 40/08* (2012.01)

(52) U.S. Cl.
CPC ......... *G06Q 30/0283* (2013.01); *G06N 20/00* (2019.01); *G06Q 10/10* (2013.01); *G06Q 30/08* (2013.01); *G06Q 40/08* (2013.01)

(58) Field of Classification Search
CPC .............. G06Q 30/0611; G06Q 30/02; G06Q 30/0283; G06Q 10/06; G06Q 50/22; G06Q 30/0202; G06Q 30/0201; G06Q 30/08; G06Q 40/08; G06Q 10/10; G06F 19/328; G06N 20/00
USPC .......................... 705/2, 4, 26.2, 26.4, 37, 400
See application file for complete search history.

(56) References Cited

U.S. PATENT DOCUMENTS

| 7,392,201 B1 * | 6/2008 | Binns | G06Q 10/10 |
| | | | 705/4 |
| 8,396,796 B1 * | 3/2013 | Vu | G06Q 40/08 |
| | | | 705/40 |

(Continued)

FOREIGN PATENT DOCUMENTS

AU     2018101217 A4 *   9/2018   ............. G06Q 40/08

OTHER PUBLICATIONS

Song et al. Competitive bidding in Medicare Advantage: Effect of Benchmark Changes On Plan Bids, Sep. 6, 2013, Journal of Health Economics, 12 pages (Year: 2013).*

(Continued)

*Primary Examiner* — George Chen
*Assistant Examiner* — Freda A Nelson
(74) *Attorney, Agent, or Firm* — Lee & Hayes, P.C.

(57) ABSTRACT

A method including determining a first bid for a healthcare plan and a second bid for the healthcare plan. A bid-pricing tool is configured to utilize one or more first components to determine the first bid and one or more second components to determine the second bid, respectively. A bid difference between the first bid and the second bid includes at least a monetary difference in premiums paid by members of the first bid for the healthcare plan and members of the second bid for the healthcare plan. One or more third components are determined based at least in part on the bid difference to determine a third bid for the healthcare plan. A second bid difference is determined between at least one of the first bid and the third bid or the second bid and the third bid.

12 Claims, 7 Drawing Sheets

(56) References Cited

U.S. PATENT DOCUMENTS

| | | | | |
|---|---|---|---|---|
| 2009/0171831 | A1* | 7/2009 | Johnson, Jr. | G06Q 40/04 |
| | | | | 705/37 |
| 2011/0264550 | A1* | 10/2011 | Fair | G06Q 30/0605 |
| | | | | 705/26.2 |
| 2014/0201021 | A1* | 7/2014 | Begley | G16H 20/00 |
| | | | | 705/26.4 |
| 2017/0330245 | A1* | 11/2017 | Guermas | G06Q 30/0275 |
| 2017/0330248 | A1* | 11/2017 | Gomariz | G06Q 30/0272 |
| 2018/0165757 | A1* | 6/2018 | Gelber | G06Q 30/08 |

OTHER PUBLICATIONS

"Bid Pricing Tool (BPT) for Medicare Advantage (MA) Plans and Prescription Drug Plans" (PDP)-CMS-10142, Jan. 2017, 277 pages. (Year: 2017).*

Lieberman et al., "A Proposal to Enhance Competition and Reform Bidding in the Medicare Advantage Program", May 2018, USC-Brookings Schaeffer Initiative for Health Policy, 25 pages. (Year: 2018).*

Bertko et al, "Medicare Advantage: Better information tools, better beneficiary choices, better competition", retrieved on Jan. 14, 2020 at <<https://www.brookings.edu/wp-content/uploads/2017/11/ma-consu mer-reforms.pdf>>, Nov. 30, 2017, 16 pages.

PCT Search Report and Written Opinion dated Jan. 29, 2020 for PCT Application No. PCT/US2019/063061, 11 pages.

Song et al, "Competitive bidding in Medicare Advantage: effect of benchmark changes on plan bids", retrieved on Jan. 14, 2020 at <<https://www.ncbl.nlm.nlh.gov/pmc/articles/PMC3893317/pdf/nihms526297.pdf>>, Dec. 1, 2014, 24 pages.

* cited by examiner

| Service Category | 304 Utilizers | 306 Net PMPM | 308 Cost Sharing | Total Benefits | | | | Utilization Adjustments to Contract Period | | | | Unit Cost Adjustment | |
|---|---|---|---|---|---|---|---|---|---|---|---|---|---|
| 302 | | | | 312 Utilization Type | 314 Annualized Utilization/1000 | 316 Average Cost | 310 Allowed PMPM | 318 Utilization/1000 Trend | 320 Benefit Plan Change | 322 Population Change | 324 Other Factor | 326 Provider Payment Change | 328 Other Factor |
| Inpatient Facility | | | | | | | | | | | | | |
| Skilled Nursing Facility | | | | | | | | | | | | | |
| OP Facility - Emergency | | | | | | | | | | | | | |
| OP Facility - Surgery | | | | | | | | | | | | | |
| ... | | | | | | | | | | | | | |
| Total Medical Expenses | | | | | | | | | | | | | |

BID TOOL OPTIMIZATION

BACKGROUND

Medicare Advantage (MA), also known as Medicare Part C, is an alternative to traditional Medicare. Under MA, the federal government contracts with private parties to provide the same level of coverage as traditional Medicare. For example, Medicare Advantage Part D (MAPD) is a program that offers Medicare eligible members coverage for prescription drugs. Every year, the private parties participate in a bid process and submit MA benefit plans, which are standalone benefit plans (PDPs), or MAPD benefit plans, that offer both MA and Part D coverage. To generate a bid, MA plans often rely on assumptions about member health, member premiums, expected costs, revenues, and so forth. Accordingly, there exists a need to optimize and test these assumptions to provide accurate and realistic bids.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example of a bid-pricing tool that may be utilized to determine one or more bid(s).

DETAILED DESCRIPTION

Figure 1:
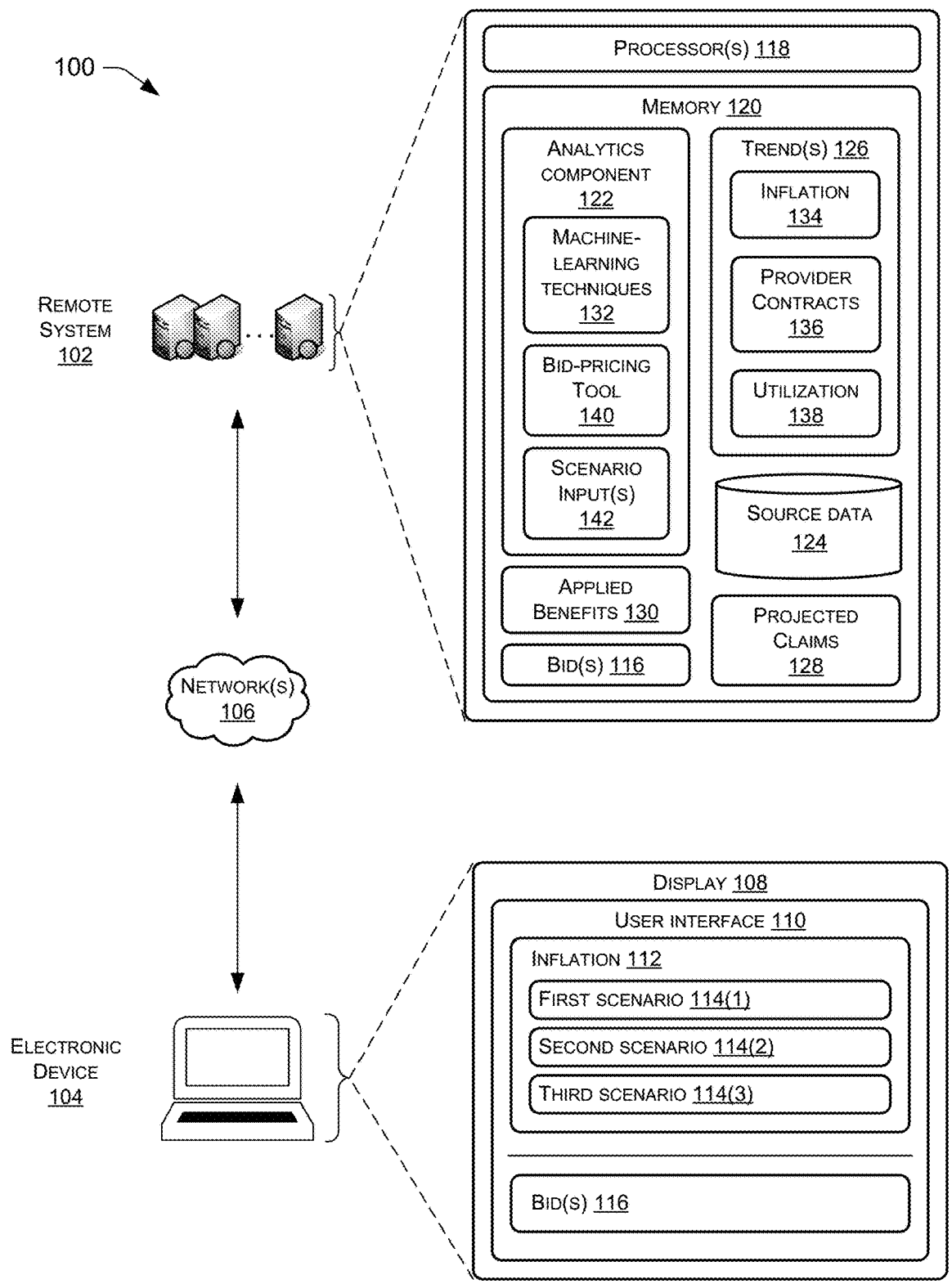
FIG. 1 illustrates an example environment for bid optimization. Shown in FIG. 1, an electronic device may communicatively couple to a remote system. The remote system may be configured to utilize machine-learning techniques and a bid-pricing tool to calculate one or more bid(s) and optimize components of the bid(s).

As an alternative to traditional Medicare, Medicare Advantage (MA) offers Medicare benefits through private health plans. On a yearly basis, Medicare Advantage Organizations (MAOs) submit plans that reflect the MAO's projected costs for a geographic region. The submitted plans are part of a bidding process that establishes terms of agreement between the MAO and the federal government, or the Centers for Medicare & Medicaid Services (CMS).

During the bidding process, which is an eight-week open-enrollment period, culminating on the first Monday of June each year, the MAOs calculate a bid (or bids) using bid-pricing tools, which are a collection of spreadsheets developed by the CMS. CMS provides different models for Part C and Part D bids, and a MAPD plan may submit one of each per benefit offering. These tools, along with federal guidelines, are not available until early April. As such, plans between different MAOs must complete the bidding process within the open-enrollment period, which is typically eight to nine weeks.

To populate the bid-pricing tool, MAOs estimate components of the bid, such as drug costs, administrative fees, benefit options, monthly premiums, out-of-pocket limits, network composition, plan type, member increase/decrease, risk scores for members, cost inflation, and so forth. In some instances, these assumptions are often forecasted by the MAO using historical data, prior claim experience, medical expertise, and/or trend analysis. For instance, MAOs may utilize a history of medical claims, pharmaceutical claims, member revenues, and/or member enrollment data to make assumptions about future MA plan designs. As an example, through analyzing historical data, the MAO may predict an increase in member enrollment and/or an increase in medical procedural costs. Predictions may also concern plan utilization to determine limitations and exclusions of a plan design and/or expected costs associated with claims under the plan design.

The amount of components that ultimately factor into the bid-submission process, or assumptions about the components, makes it difficult to generate an accurate and optimized bid for a particular geographical region or area. Moreover, the relatedness between some components and/or assumptions about the components of the bid, such as member enrollment, may impact revenues, monthly premiums, in ways that are not predictable with a model. As such, before populating the bid-pricing tool, MAOs may perform extensive analysis to optimize assumptions and bids. Such process, however, is often not optimized within the limited time allotted to complete the bid(s).

Accordingly, in light of the above, described herein are techniques that allow for optimized bid submission for MA and/or MAPD plan designs. In some instances, the techniques utilize machine-learning techniques that generate, utilize, test, and/or make predictions about how assumptions of a plan design impact the bid. For instance, the machine-learning techniques may iteratively run multiple scenarios that include iterations of plan benefits and/or a set of assumptions that hypothesize or test the effect on the bid. For instance, a MA plan may offer multiple benefits (e.g., testing, screening, certain copays, dental, etc.), and the machine-learning techniques may evaluate these benefits across multiple scenarios to determine a viability of a MA plan. Such evaluation may also indicate trends between components of the bid, the sensitivity certain components have on the bid, and/or assumptions about the components of the bid. Therein, an optimized set of assumptions may serve as inputs into the bid-pricing tool. As such, the machine-learning techniques make it possible to test the efficacy of assumptions, in a time-sensitive manner, to determine an optimized set of inputs during the bid-submission process and decisions about a plan design, such as benefits offered, to update core assumptions within the bid-submission process.

The machine-learning techniques may be configured to receive a variety of inputs or assumptions when calculating bid(s). Additionally, the machine-learning techniques may be compartmentalized into stages, where each stage may receive inputs from a previous stage to generate outputs, which are then fed into a subsequent stage and utilized by the machine-learning techniques. These inputs and outputs may be utilized to model, or otherwise determine, the impact of a certain set of assumptions on the overall bid-submission process. In other words, the machine-learning techniques allow for multiple hypotheticals and/or scenarios to be formulated as inputs, where each hypothetical represents or includes a set of assumptions. Therein, the results (or outputs) of the scenarios may be compared against one another to observe an impact on the bid. For instance, a MAO may make an assumption about an increase in medical care costs (e.g., inflation rate) through utilizing historical data from previous plan designs. Here, the machine-learning techniques, may accept, as inputs, a range of inflation rates (e.g., between 1% and 5%) while keeping other components of the bid constant (e.g., utilization). Through dynamically altering the input associated with a component, it is possible to observe the effects on the bid. For example, after determining bids for the range of inflation rates, the effects may be compared against one another to determine impacts on revenues, cost sharing, profitability, and so forth. As such, the machine-learning techniques may be utilized to test a range of scenarios, in parallel, while varying a single component over a range of values. In this sense, the machine-learning techniques increase the scalability of optimizing benefits for a plan design and making decisions about future components of a bid.

In these examples, and through varying the assumptions (or values associated with the assumptions), it is possible to determine whether, and to what extent, certain assumptions and/or components influence the bid. For instance, continuing with the above example, by varying the inflation rate, the results may be compared. The comparison may indicate that varying the inflation rate has little effect on the bid. This result, or bid difference, may be used to correlate assumptions of the bid, or lack thereof, with one another. Here, as MAOs have a limited amount of resources to devote to screening tests, benefits, payouts, and so forth, the machine-learning techniques allow for the optimization of assumption across plan designs. As the resources a MAO may devote to a MA plan may be a benchmark of expected costs and revenues, optimizing the assumptions and benefits serves to increase the viability of a MA plan design. In other words, the machine-learning techniques assist MAO is making decisions about plan designs and what geographical areas the MAO may want to offer a plan.

As another example, the machine-learning techniques may examine the impact on providing benefits, such as certain screening tests or offering dental coverage, under a MA plan. For instance, a plan design may fully cover a low-dose computed tomography (LDCT) screening test for the early detection of lung cancer. Here, as the plan fully covers the LDCT screening test, in addition to the early detection of a disease or risk factors of the disease, the early detection or diagnosis may reduce claim cost and/or utilization in the future. The machine-learning techniques may also model the impact on the bid (e.g., member premiums) by providing the LDCT screening test over a range of co-pay values. Through comparing the results between fully covering the screening test and offering the screening test with a co-pay, bid differences may be determined. This bid difference may be utilized to determine whether providing the LDCT screening test is viable under a plan design and/or whether to offer the screening tests at an optimized co-pay amount. Therefore, a MAO may utilize the results of the machine-learning techniques to make one or more decisions about future plan designs.

In some instances, assumptions about certain components of the bid may be considered independent or dependent, where independent assumptions are not impacted by changes in other assumptions, while dependent assumptions are impacted by changes in other assumptions. In other words, returning to the above example, modeling assumptions about the increase in an inflation rate across the range of values may indicate little impact on the bid. As such, these results may be used to determine that the inflation rate is an independent variable that has little impact on the bid and/or on other components of the bid (e.g., large member premiums). However, whether a plan fully covers a screening test may indicate impacts on the bid. The screening tests may therefore be considered a dependent variable. In turn, MAOs may consider less components of the bid when optimizing a set of assumptions and/or determining benefits under a plan design for a particular geographical area.

As assumptions and/or scenarios are simulated by the machine-learning techniques, components of the bid-submission process that have a larger impact on the bid may be determined. In doing so, the machine-learning techniques may adapt and/or recognize those assumptions that have an impact on the bid (e.g., a bid difference) through varying inputs across a plurality of components. Such implementation may increase the scalability of testing multiple assumptions and their impact on the bid. Moreover, through categorizing certain assumptions and/or components of the bid-submission process, components may either be eliminated or remain part of the bid calculation process. That is, with the above example, as the inflation rate may be considered an independent variable, calculations associated with the inflation component may be removed from the bid-optimization process, as the inflation rate may not impact the bid or impacts the bid below a threshold.

Additionally, the machine-learning techniques may also be used to perform validation tests. For instance, components of the bid calculation process may be compartmentalized. Through compartmentalizing stages of the process, if an assumption is deterministic, the output of a certain stage may be compared against thresholds and/or expected values. For example, assumptions about inflation rates, member increase, provider contracts, cost inflation, applied benefits, risk scores, and/or utilization may serve as inputs at a projected claims stage. Here, the projected claims stage may output an amount an MAO will reimburse member claims, where the reimbursement is determined using the results of a previous stage (e.g., trend(s)). Through varying values associated with these assumptions, for instance, ranges of the projected claims are then calculated. These outputs may be compared against a threshold and/or historical data trends to determine whether the projected claims are within certain expected values. If not, then an error may be determined within the projected claims stage. However, if the values are within the expected range, then the projected claims may serve as inputs into a subsequent stage, such as a member premium stage. With these stages, the validation may determine whether the outputs fall within a user defined acceptable range and/or whether to flag certain outputs for further review. This process may potentially eliminate downstream errors within the bid-optimization process. In other words, through compartmentalizing the bid simulation process in this manner (e.g., into stages) errors may be iteratively determined as compared to recognizing an error after calculating the bid. In doing so, errors may be pinpointed at specific stages in the process and before these errors are input into subsequent stages.

Compared to conventional methods, utilizing the machine-learning techniques discussed herein allow multiple assumptions and/or components of the bid-submission process to be considered in combination and/or in parallel. Through varying assumptions across a range of values, analyzing hypothetical scenarios (e.g., funding), and observing how assumptions impact the bid, it is possible to determine an optimized set of assumptions, such as evaluating different benefit packages, for a MA plan design. In other words, the results of the machine-learning techniques may determine and/or indicate trends between various assumptions and/or components of the bid-submission process that are more likely to occur and/or that affect the bid. Such process may be performed in a time-efficient and time-sensitive manner given the limited amount of time for MAO to review and submit bid(s). Additionally, this process saves both time and computing resources.

For instance, using the machine-learning techniques and comparing bid differences, certain assumptions and/or or components may be determined to be constants (e.g., having little or no effect on the bid) or may not be deterministic. Noted above, to determine constants, an iterative range of assumptions for a component of the bid-submission process may be performed in parallel to observe impacts on the bid. As a result, through determining these constants, or whether an assumption is deterministic, certain components may not be utilized by the machine-learning techniques and/or the MAO when optimizing a bid. In turn, computing resources may be saved and faster calculations are performed as less calculations may be performed.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated and/or described in connection with one embodiment may be combined with the features of other embodiments, including as between systems and methods. Such modifications and variations are intended to be included within the scope of the appended claims. Additional details are described below with reference to several example embodiments.

FIG. 1 illustrates a schematic diagram of an example environment 100 for bid optimization using machine-learning techniques, according to various examples of the present disclosure. The environment 100 may include a remote system 102 and an electronic device 104 communicatively coupled to the remote system 102. The electronic device 104 may communicate with the remote system 102 via one or more network(s) 106. The communication between the remote system 102 and the electronic device 104 may include sending and/or receiving data associated with a bid submission process for a healthcare plan. For example, the electronic device 104 may receive inputs from a user and generate input data that is transmitted to the remote system 102. In some instances, the input data may represent assumptions and/or scenarios to be computed by the remote system 102 when determining bid optimization.

The electronic device 104 is shown including a display 108 having a user interface 110. Within the user interface 110, a user may input certain assumptions (e.g., values, characters, text, percentages, etc.) about components of a bid that are used to calculate the bid. For instance, components of the bid may include benefits offered by a MA plan, premiums paid by members enrolled in the plan, co-pay amounts, inflation rates, projected claims, projected risk scores, and so forth. Collectively, in some instances, these components may be utilized when calculating the bid.

Components of the bid(s) may include known items, such as chosen benefit design values (e.g., applied benefits 130) and projected items such as a cost inflation of risk scores associated with patients under the MA plan. The true values of the components are not known at the time of bid preparation, and estimates, or assumptions, about these components may be made. For instance, FIG. 1 illustrates the user interface 110 includes inflation 112 where the user may input a range of values associated with an assumed or projected inflation of the medical costs and/or member increase. However, to optimize components of the bid, the user may desire to input multiple inflation values and determine bid differences therebetween as well as an affect the inflation component has on the bid. Such determination may indicate whether the inflation component is deterministic for other components of the bid. For instance, FIG. 1 illustrates that the inflation 112 may include a first scenario 114(1), a second scenario 114(2), and a third scenario 114(3) (collectively referred to herein as "the scenarios 114"). The scenarios 114 may individually correspond to values of the inflation 112 and may be utilized by the remote system 102 to determine respective bids 114. Therein, bid(s) 116 corresponding to the scenarios 114 may be displayed on the user interface 110 for making one or more decisions about optimizing components of the bid(s) 116. For instance, the one or more decision may relate to offering certain benefits within a particular geographical area or the viability of offering a plan design within the particular geographical area.

The remote system 102 may include one or more processor(s) 118 and memory 120 storing or having access to modules, components, databases, and the like. For instance, FIG. 1 illustrates that that the memory 120 may store and/or have access to an analytics component 122, source data 124, trend(s) 126, projected claim 128, and/or applied benefits 130. Discussed in detail herein, to generate the bid(s) 116, the analytics component 122 may utilize machine-learning techniques 132 that accesses data stored in the memory 120, received from third-parties, and/or received from the electronic device 104.

Beginning with the source data 124, the source data 124 may represent a database of previous medical records and/or plans offered by a MAO. For instance, as the bid-submission process occurs yearly, the MAO may store information associated with previous MA plan designs and claims associated with those previous plan designs. As such, the source data 124 may correspond to previous plan(s), medical claims under the plan(s), pharmaceutical claims under the plan(s), member(s) enrolled in the plan(s), an amount of revenue from each member of the plan(s), and so forth. In some instances, the source data 124 may be aggregated by plan, plan type (e.g., medical or pharmaceutical), claims (e.g., inpatient facility, ambulance, etc.), geographical location where the plan was offered, a time the plan was offered, demographic(s) of the member(s) enrolled in the plan, benefit(s) offered by the plans, and so forth. Additionally, or alternatively, the source data 124 may be categorized, such as being categorized based on plan type. In some instances, the analytics component 122 may be utilized to aggregate and/or categorize the source data 124 into the categories.

The trend(s) 126 may include assumptions that the MAO determines when designing the plan. In some instances, the trend(s) 126 may correspond to inflation 134, provider contract(s) 136, and/or utilization 138. The inflation 134 may relate to trends associated with an amount of medical claims, a cost of medical claims, membership enrollment, and so forth. The provider contract(s) 136 may include data relating to contracts between the MAO and outside healthcare provider(s), such as costs and/or services offered by the contracted healthcare provider(s). Here, the trend(s) 126 associated with the provider contract(s) may indicate increased/decreased costs in medical procedures, whether certain medical procedures and/or visits are contracted between the MAO and the healthcare provider, an amount of contracting services, and so forth. Further, the utilization 138 may include changes to the overall rate of services being used by a particular population, or a different combination of services and/or benefits, under a plan within a geographic area (e.g., county). In some instances, the trend(s) 126 may be generated and/or determined using the source data 124. For instance, the machine-learning techniques 132 may analyze the source data 124 and determine the trend(s) 126 associated with the inflation 134, the provider contracts 136, and/or the utilization 138.

The projected claim 128 may relate to an amount of claims and/or a cost of claims the MAO expects to pay under the plan. For instance, depending on the coverage of a certain plan, the MAO may make determinations about the projected claim 128.

The applied benefits 130 may correspond to benefits offered under the plan, premiums paid by the members of the plan, a share of coverage, or an amount and/or existence of co-pays or coinsurance, and so forth. For example, under a certain plan design, the MAO determine to fully cover a certain screening test for glaucoma or whether to offer dental coverage for a particular geographical area. Here, the applied benefits 130 may indicate a cost associated with providing the screening tests, for instance. Additionally, the applied benefits 130 may correspond to multiple benefits (e.g., testing, screening, etc.) offered under a particular MA plan design, and the machine-learning techniques 132 may evaluate these benefits across multiple scenarios to determine a viability of a MA plan offering the benefits.

Ultimately, as the bid(s) 116 represents a plan that includes a set of assumptions, the machine-learning techniques 132 may allow for variations of these assumptions to be considered and modeled. That is, as the bid(s) 116 rely on a variety of assumptions, a set of assumptions about the trend(s) 126 and/or the applied benefits 130, for instance, may be utilized when determining the bid(s) 116. These assumptions, or components of the bid(s) 116, may be formulated as input(s) into a bid-pricing tool 140, where the bid-pricing tool 140 may calculate the bid(s) 116 for a respective set of assumptions.

In some instances, the machine-learning techniques 132 may be configured to populate the bid-pricing tool 140 to calculate the bid(s) 116. For instance, as some components of the bid(s) 116 rely on assumptions, the machine-learning techniques 132 may be utilized to run or perform analysis on multiple scenarios, such as the scenarios 114. For instance, returning to the above example, the machine-learning techniques 132 may determine bid(s) 116 associated with each of the scenarios 114 through utilizing the bid-pricing tool 140. Here, the machine-learning techniques 132 may input the scenarios 114 into the bid-pricing tool 140 to calculate the bid(s) 116.

The machine-learning techniques 132 may accept as inputs, scenario input(s) 142 that represent the different scenarios (e.g., the scenarios 114) to be tested by the machine-learning techniques 132. The scenario input(s) 142, in other words, corresponds to scenario that including a set of plan benefits, assumptions, and other inputs that are input into the machine-learning techniques 132. Such process increases the scalability of testing multiple plan designs as well as their viability. The scenario input(s) 142 may be combined in a run of the machine-learning techniques 132 to test their effect in concert. For instance, the first scenario 114(1) may include an inflation of 2%, the second scenario may include an inflation of 3%, and the third scenario may include an inflation of 4%. The machine-learning techniques 132 may iteratively calculate the bid(s) 116 associated with each of these values and the bid(s) 116 using the bid-pricing tool 140. The results (i.e., the bid(s) 116) may be compared against one another to determine bid differences therebetween.

With the results of the machine-learning techniques 132 and through analyzing the bid differences, conclusions about the impact of certain components on the bid(s) 116 may be determined. These conclusions may be utilized to test and/or generate assumptions for other plan designs. For instance, through calculating bid(s) 116 associated with each of the scenarios 114, the results may indicate that the inflation 112 has little impact on the bid(s) 116. As such, the machine-learning techniques 132 may be utilized to indicate whether a certain component (e.g., inflation 112) has an impact on the bid(s) 116. In such instances, if the inflation 112 has little to no effect on the bid(s) 116, this component may not be considered (e.g., may not be deterministic) when optimizing a plan. In other words, through testing the scenarios 114 over a range of inputs, and observing their effect on the bid(s) 116, it may be possible optimize computing resources when calculating the bid through excluding certain components. That is, while the inflation 112 may be a required component of the bid-pricing tool 140 submitted to the CMS, for purposes of optimizing a bid, the machine-learning techniques 132 may not consider this component.

However, while one scenario is illustrated in FIG. 1, it is to be appreciate that multiple scenarios may be considered together. For instance, the machine-learning techniques 132 may analyze a range of values associated with the inflation 134, the provider contracts 136, the utilization 138, and/or applied benefits 130 to determine difference(s) in the bid(s) 116. Such consideration of the bid components may indicate correlations between the components. For instance, if a plan fully covers a particular screening test for glaucoma, the projected claim 128 may potentially decrease (in number and amount) given the early detection and potential decreased pay out for future glaucoma claims. Additionally, the trend(s) 126 may indicate that fully covering the screening test for glaucoma will lead to an increased member enrollment. Herein, the machine-learning techniques 132 may calculate bid(s) 116 associated with a range of values for the inflation 112 in unison with the applied benefits 130. Through comparing the bid(s) 116, an optimized inflation, optimized amount or coverage of screening tests, and/or an optimized increase in member enrollment may be determined.

Moreover, with the variability in assumptions, it is difficult to not only optimize assumptions but also optimize the assumptions in a time-sensitive manner. However, because the machine-learning techniques 132 may calculate the bid(s) 116 for varying sets of assumptions and compare differences therebetween, as noted above, the techniques herein may eliminate certain components from the bid optimization process. As a result, the machine-learning techniques 132 may consider less inputs when calculating the bid(s) 116, which saves both time and computing resources. In other words, while inflation may have little effect on the bid(s) 116, the applied benefits 130 and/or the provider contracts 136 may have more of an effect on the bid(s) 116. Here, the MAO may devote more time and resources to optimizing assumptions about the applied benefits 130 (e.g., scenario inputs 142), as compared to inflation, given the little impact of inflation on the bid(s) 116. These conclusions are useful in optimizing certain assumptions about the components and determining relationships between components of the bid(s) 116.

After calculating or determining the bid(s) 116, the analytics component 122 may cause the remote system 102 to send the bid(s) 116 (or data associated therewith) to the electronic device 104 for display. Upon receiving the bid(s) 116, the electronic device 104 may display the bid(s) 116 on the user interface 110, where a user may view the bid(s) 116.

Accordingly, the above process allows for accurate, expedited, and optimized bid submission. First, such the accuracy of the bid(s) 116 has a significant impact on the viability of the MAOs and plan(s). For instance, in instances where the bid is accepted, the CMS will pay each MAO (or plan) a prospective capitation payment based on a maximum or benchmark amount. The CMS determines the benchmark amount using traditional Medicare spending. Under this system, however, if a disparity exists between the bid and the benchmark amount, the CMS will pay the MAO the lower of the bid or the corresponding maximum. For instance, if the bid amount is greater than the benchmark, the CMS will pay the benchmark amount and the MAO will pay the difference. Alternatively, if the bid is less than the benchmark, the CMS will pay the bid amount plus a MA rebate amount to the MAO. This rebate, which is equal to a percentage of the difference and based on a quality rating of the plan, must be used by the MAO to offer additional supplemental benefits to members. As a result, MAOs are incentivized to submit accurate bids. However, it is often difficult to accurately predict assumptions for an upcoming year, such as membership inflation, projected claims, and so forth. Given that these assumptions may ultimately impact the bid, the assumptions may implicate the amount of financial support received from the CMS.

Further, the processes herein, which allow for simultaneous testing of multiple scenarios, determines an optimized set of assumptions for a plan design to simulate combinations of benefits offered under a plan design and a profitability of the plan design. Through the machine-learning techniques, and considering a wide variety of components across multiple scenarios, plan design may avoid offering too few benefits and failing to attract members, or alternatively, offering too many benefits and attracting too many members (which a plan may be unable to afford). Hence, the processes may run multiple scenarios, with varying benefits, for instance, and determine a viability of the plan.

Additionally, bid submissions are given a star rating, which corresponds to quality and performance for the types of services each plan offers. In some instances, this rating is based on or is a factor of screening tests and vaccines, managing chronic conditions, member experience, customer service, pricing, and other benefits under the plan. This rating also impacts the rebate offered to the MAO, representing another incentive to provide accurate bidding. The techniques herein make it possible to test hypothetical scenarios in a time-sensitive manner in the short amount of time to complete the bid-pricing tool 140 and to generate the bid submission.

The processes herein may also reduce submission errors contained with bids, which could potentially lead to compliance actions for a MA plan.

Figure 2:
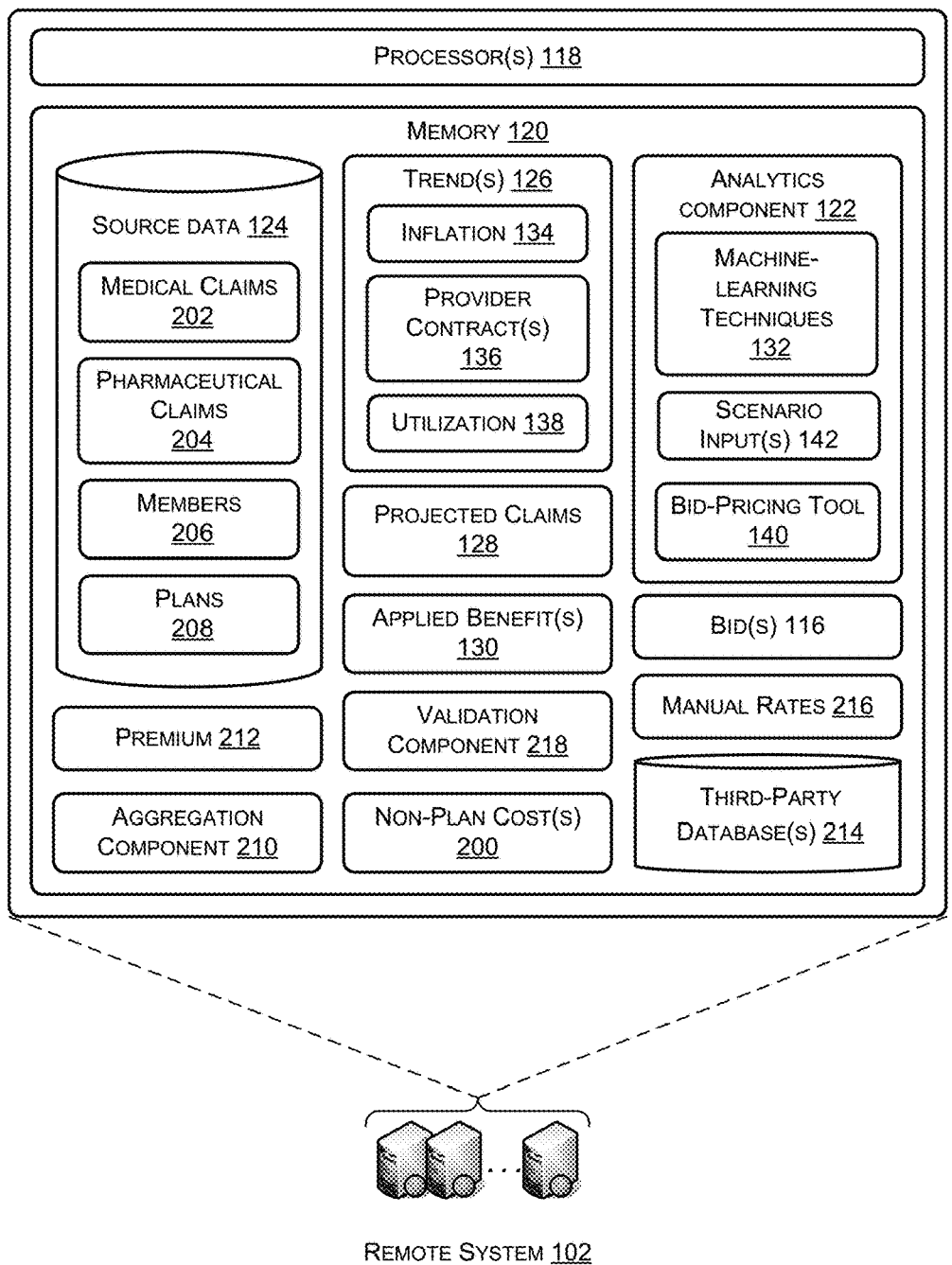
FIG. 2 illustrates selected functional components of the remote system of FIG. 1.

FIG. 2 illustrates selected functional components of the remote system 102. The remote system 102 includes the processor(s) 118 and the memory 120. As illustrated, the memory 120 stores or otherwise has access to the analytics component 122, the source data 124, the trend(s) 126, the projected claim 128, and/or the applied benefit(s) 130. The analytics component 122 includes the machine-learning techniques 132 that are configured to utilize the scenario input(s) 142 and/or other data when generating the bid(s) 116. For instance, the machine-learning techniques 132 may receive the scenario input(s) 142 and determine the bid(s) 116 utilizing the bid-pricing tool 140. Discussed in detail herein, to generate the bid(s) 116, in some instances, the machine-learning techniques 132 may utilize the source data 124, the trend(s) 126, the projected claim 128, the applied benefit(s) 130, and/or non-plan cost(s) 200, any or all of which may represent the scenario input(s) 142.

The source data 124 may include medical claim 202, pharmaceutical claim 204, members 206, and/or plans 208. The medical claim 202 may include previous medical claims relating to patients, beneficiaries, or members enrolled in previous MA plans offered by a MAO. The pharmaceutical claim 204 may include previous drug or pharmacy claims of members of plans. The members 206 may include information relating to the members enrolled in the previous MA plans or members that are enrolled under a plan with the MAO. For instance, the members 206 may include a list of members, biographical data relating to the members, a previous medical record of the members, and so forth. The plans 208 may include information relating to previous plans offered by the MAO. For instance, the plans 208 may include information relating to premiums of the previous plan(s), a service area of the plan (e.g., geographical area) benefits offered under the previous plan(s), an amount of claims under the previous plan(s), and so forth.

An aggregation component 210 may be configured to aggregate one or more of the source data 124. For instance, the aggregation component 210 may aggregate the medical claim 202 by geographic location, time, demographics, claim type (e.g., visit, stay, surgery, etc.), MA plan, and so forth. Aggregating the source data 124, or portions thereof, may indicate areas of emphasis for the applied benefits 130. For instance, the aggregated medical claim 202 may indicate a sufficiently high number of medical claims for heart disease. Discussed herein, for example, a MAO may utilize the high incidence of heart disease claims to offer screening tests as an applied benefit 130 under a plan. However, in some instances, some of the source data 124 may not be aggregated, such as the pharmaceutical claim 204.

As discussed in relation to FIG. 1, the trend(s) 126 may include forecasts and/or assumptions that are determined and/or made when designing a MA plan and may include inflation 134, provider contract(s) 136, and/or utilization 138. In some instances, the trend(s) 126 may be determined by the aggregation component 210 and/or the machine-learning techniques 132 using the source data 124.

The non-plan cost(s) 200 may relate to components of the bid(s) 116 such as premiums paid by the CMS (e.g., funding), budgets, administration costs, and so forth. Additionally, premiums paid by the CMS may be altered by a risk adjustment factor (RAF), which ensures payments to the MAOs reflect the expected cost of providing care to each member. The RAF represents a relative measure of the probable costs to meet the needs of the member, where the RAF is used to adjust payments for a member's predicted level of risk. In doing so, the MA effectively pays more for members who are expected to cost more. For example, older members typically have a higher RAF than younger members. The CMS therefore modifies the payments administered to MA plans to reflect the health of each beneficiary. As it pertains to the bid-submission process, the RAF is in some instances another component of the bid(s) 116. In other words, an MAO may estimate the RAF for members enrolled under a plan design.

The machine-learning techniques 132 may use these components to calculate the bid(s) 116. The bid(s) 116 may be used to determine a share of claims covered by the MAO, non-benefit expenses, profit margin of the MAO, revenues paid by the CMS, and/or a premium 212 paid by members of the plan.

To illustrate an example scenario, in designing a MA plan, among other components, the MAO may want to determine a bid corresponding to an increased inflation of 2%, a utilization of 5%, and fully covering a certain screening test for heart disease. In some instances, these values and/or assumptions may be determined using the source data 124. The machine-learning techniques 132 may accept these values as inputs (e.g., scenario input(s) 142). As it pertains to fully covering the certain screening test for heart disease, the machine-learning techniques 132 may receive inputs corresponding to costs associated with the screening test, a number of the predicted screening test expected to be administered, and/or potential cost savings associated with providing the screen test (e.g., future claims). Here, therefore, the machine-learning techniques 132 may generate a bid 116 for this scenario. In generating the bid 116, the machine-learning techniques 132 may utilize the bid-pricing tool 140 and populate components of the bid-pricing tool 140. For other components of the bid 116, such as provider contracts 136, the machine-learning techniques 132 may hold this value constant. In other words, the scenario to be tested by the machine-learning techniques 132 includes the inflation at 2%, the utilization of 5%, and the screening test for heart disease. In other instances, the values of the additional components may be tested across a range of values to observe their impact on the bid 116.

After generating the bid 116, the results may be analyzed, where the results may serve to indicate whether the particular scenario is beneficial or profitable for the MAO. The results may also be utilized to determine one or more assumptions for other plan designs, such as whether the MAO should offer a particular benefit. Accordingly, through iteratively refining and testing a range of scenarios with the machine-learning techniques 132, the assumptions about the components, or decisions about those components, may be optimized for the bid 116. For instance, the bid 116 corresponding to the above example may indicate that the inflation rate of 2% is too high. Using this result, the machine-learning techniques 132 may test a different scenario with an inflation of 1%. Here, the machine-learning techniques 132 may determine that this bid 116 may be profitable. As a result, the MAO may utilize such results to design a plan around a 1% inflation rate, which may involve restricting provider contracts 136 to lower medical costs, increasing a co-pay to cover some of the costs of inflation, and so forth. However, it is to be understood that while the above example is illustrated, there are numerous combinations of components that may be considered in unison and/or tested over a range of values to determine effects on the bid(s) 116.

As an additional example, the machine-learning techniques 132 may determine bid(s) 116 associated with a range of non-benefit costs 200, such as costs associated with the payroll of the MAO. In calculating the bid(s) 116, the machine-learning techniques 132 may determine an optimized payroll expenditure, which may be used by the MAO when budgeting for upcoming years.

In some instances, MA plans may be designed for which source data 124 is not available. For instance, as MA plans are often based on geographic area, a MAO may design a plan for a new geographical area (e.g., county) the MAO does not have historical data (e.g., medical claims 202). Here, the MAO may utilize on one or more third party database(s) 214 that includes data about previous plans from other MAOs, such as benefits offered under the previous plan(s) and/or medical claims, demographic information about the new geographical area, or information associated with other participating providers in the geographical area. In some instances, the data from the third-party database(s) 214 may be utilized to make assumptions about the new geographical area. For instance, the assumptions may include projected claim 128 and/or applied benefits. In some instances, the third-party database(s) 214 may include Milliman, the CMS, Medicare, and the like.

Utilizing the third-party database(s) 214, or information extracted therefrom, manual rate(s) 216 may be determined. The manual rates 216 may represent assumptions about future markets of the new geographical area. Here, the machine-learning techniques 132 may utilize the manual rate(s) 216, as well as the trend(s) 126, the projected claim 128, the applied benefit(s) 130, and/or the non-plan costs(s) 200 to generate the bid(s) 116.

The machine-learning techniques 132 and/or portions of the bid submission process may be compartmentalized into stages. For instance, at one stage the trend(s) 126 may be determined, while at another stage the applied benefit(s) 130 may be determined. Additionally, in some instances, one or more of the stages may depend on one another. For instance, results from one component of the bid 116 may feed into a subsequent component of the bid submission process. As one example, the trend(s) 126 may affect the projected claim 128 and/or the applied benefit(s) 130. Here, for instance, the trend(s) 126 may be utilized to calculate a value for the projected claims 128. For instance, if inflation 134 is assumed to increase 1%, then this increase in cost may impact the projected claims 128. Further, the projected claim 128 may be utilized to calculate the applied benefits 130, where the projected claim 128 may affect an amount of co-pays.

Accordingly, the machine-learning techniques 132 discussed herein may utilize a series of inputs and outputs that are fed into subsequent stages to calculate the bid(s) 116. Through compartmentalizing the stages of the bid submission process it may be possible to observe constants between scenarios. That is, as the machine-learning techniques 132 determine the bid(s) 116 for a certain set of assumptions, through progressively feeding the inputs and outputs into different stages of the machine-learning techniques 132, the results may be compared. In other words, in addition to or alternative from comparing the bid(s) 116 for difference scenario input(s) 142, components of the bid 116 may be compared on a more macro level. That is, the applied benefit(s) 130 from a first scenario may be compared with the applied benefit(s) 130 from a second scenario. In this manner, the discrete inputs and outputs at each stage of the bid-submission process may be compared to one another.

Moreover, through compartmentalizing the stages of the bid submission process, it is possible to observe consistent or constant results across multiple scenario input(s) 142. Through this comparison, some components of the bid submission process may be considered constant in the sense that the component does not affect the bid(s) 116 or impacts the bid(s) 116 below a threshold level. In other words, as the process is compartmentalized into stages and through comparing the results of the stages, consistencies may be recognized. As noted above, these components may not be determinative when optimizing assumptions for the bid(s) 116. For instance, varying the utilization 138 across a range of values may indicate a strong impact on the bid 116. In these scenarios, by varying assumptions of a component (e.g., the utilization 138) across a range of values, and keeping other assumptions constant, it is possible to observe correlations between components, consistencies when testing a range of values or different scenario input(s) 142, and also observe the effect components have on the bid(s) 116. Such correlations may be used to indicate relationships between components of the bid(s) 116, such as whether components have a negative, positive, or neutral relationship with the bid(s) 116.

In some instances, the machine-learning techniques 132 may perform scenarios in parallel. For instance, the machine-learning techniques 132 may perform a plurality of simulations while varying one component over a range of values. Through performing these calculations in parallel, it is possible to observe the outputs that do not change based on the varying components. Those calculations for the changing variable may be performed, while those calculations for the variables that do not change a threshold percentage may not be performed, which allows for the computing of a bid difference with regard to the changing component. Here, this process allows for the simulation of varying components, while not factoring in other components, which saves both time and computing resources. Additionally, the machine-learning techniques allow for the scalability of testing multiple assumptions for a plan design.

Moreover, because the bid submission process may be compartmentalized into stages, error-check and validation may be performed. For instance, the remote system 102 may also include a validation component 218, which may perform an error-checking step during the generation of the bid(s) 116. For instance, as some components of the bid(s) 116 are fed into other component(s) of the bid(s) 116 by the machine-learning techniques 132, the validation component 218 may determine whether input(s) and/or output(s) from the stages of the bid-submission process are within a predefined or acceptable range. As an example, if a component is deterministic, such as the premium 212, values of the premium 212 may be compared against threshold levels. If the values do not fall within a threshold level, the machine-learning techniques 132 may determine an error. The validation component 218 may therefore confirm that the outputs of one component is correct before these outputs are then inputted into subsequent stages. In instances where the output(s) of a component do not fall within an acceptable range or threshold, these outputs may be flagged for further review. Such flagging may allow for errors to be quickly located for troubleshooting.

As used herein, a processor, such as processor(s) 118, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 118 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 118 may possess its own local memory, which also may store program components, program data, and/or one or more operating systems.

The memory 120 may include volatile and nonvolatile memory, removable and non-removable media implemented in any method or technology for storage of information, such as computer-readable instructions, data structures, program component, or other data. Such memory 120 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 120 may be implemented as computer-readable storage media ("CRSM"), which may be any available physical media accessible by the processor(s) 118 to execute instructions stored on the memory 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIG. 3 illustrates an example bid-pricing tool 300, which may represent the bid-pricing tool 140 discussed hereinabove with regard to FIGS. 1 and 2. In some instances, the bid-pricing tool 300 represents an excel worksheet that is provided by the CMS during a bid-submission period and that is to be completed by MAOs. In addition, some portions of the bid-pricing tool 300 may be automatically populated and/or calculated by macros enabled within the bid-pricing tool 300, which are set by the CMS.

Displayed in column 302 are service categories, which correspond to claims under a plan design (e.g., benefit service categories). For instance, column 302 may include service categories such as inpatient facility, skilled nursing home, outpatient (OP) emergency, and so forth. The service category in column 302 may be utilized to organize the bid-pricing tool 300 by claims corresponding within those service categories (e.g., inpatient facility).

Displayed in column 304 is the number of utilizers or an amount of plan members that utilized the service categories in a base period, or prior contracting period. Column 304 therefore reflects the number of members who incurred a service during the base period corresponding to the specified service category in column 302.

Column 306 is populated with a net medical cost per member per month (PMPM) for each of the service categories. The net PMPM represents the cost per member per month or the amount each member of the group plan paid for his or her coverage during a base period.

Column 308 represents cost sharing, the values of which are automatically calculated as the difference between column 310, which is an allowed PMPM, and the net PMPM in column 308. The allowed PMPM in column 310 represents an allowed PMPM for the service category in column 302, which is completed by the MAO as a projection.

Column 312 includes utilization type for each benefit in the service type. The utilization type may include, among others, a (admits), d (days), v (visits), or p (procedures). In some instances, the utilization type entered in column 312 may be automatically populated by the bid-pricing tool 300 based on the service category in column 302.

Column 314 represents annualized utilization per thousand members enrolled in the plan and for each of the benefit service categories. The annualized utilization refers to an annualized use of hospital or other institutional care and the number of hospital days in a year for each thousand covered lives.

Calculated in column 316 is the average cost, which is automatically calculated using the annualized utilization in column 314 and the allowed PMPM in column 310.

Column 318 includes the utilization trend factor for a contract period. Here, the utilization trend factor is used to reflect the impact on utilization for changes in medical management. For example, a factor of 1.0 would indicate a 0% trend.

Column 320 represents a multiplicative adjustment factor for any benefit plan change, such as an increase in coverage level for the contract period, that affects the utilization by service category. For example, entering 1.0 would indicate a 0% change.

Population change is shown in column 322, which includes expected demographic or morbidity changes that are necessary to adjust the claims under the base period data to the contract period. Entering 1.0 would indicate a 0% change.

Column 324 includes any other utilization factor adjustment by service category. As an example, the use of this factor would reflect the impact on utilization of a change in the service area from the base period to the contract year. Entering 1.0 would indicate a 0% adjustment.

Column 326 represents unit cost adjustments for expected changes in provider payments from the base period to the contract period by service category. Examples of this type of change include changes in provider reimbursement due to inflation, sequestration, an indexing provision in provider contracts, or changes in the capitation amount aside from those attributable to changes in utilization or benefit changes. Entering 1.0 would indicate a 0% trend.

Lastly, column 328 includes any other factors for unit cost adjustments by service category. An example of this type of change is a change in unit cost due to intensity of service trend or the impact on unit costs of the covered population's change in risk from the base period to the contract period. Entering 1.0 would indicate 0% adjustment.

Each of the components, that is, those values that are entered into the columns, individually and collectively impact a bid that is submitted for a plan design. That is, after completing the bid-pricing tool 300 and populating the columns, the bid-pricing tool 300 calculates a bid that is submitted to the CMS for approval. However, knowing which values to input into the bid-pricing tool 300 is crucial in order to optimize components of the bid and generate an accurate bid. Often, these assumptions are based on previous plan design and previous claims (e.g., the source data 124). In other words, because the bid-pricing tool 300 relies on assumptions for the contract period, such as population change (e.g., column 322), the bid may be affected depending on the population change values entered per service category. In turn, there is a desire to test multiple population change values, for instance, per category to determine the impact on the bid. As such, before submitting a final bid design, iterations of assumptions may be tested utilizing the bid-pricing tool 300, the results of which may allow the MAOs to strategize about how to adjust assumptions or components of the bid.

In some examples, as noted above, the bid-pricing tool 300 may be utilized by machine-learning techniques 132 to populate the columns and determine bid differences between different sets of assumptions. Such utilization not only automates the bid optimization process, but performs time-sensitive calculations in an efficient and iterative manner.

Although the bid-pricing tool 300 and the columns shown in FIG. 3 are examples, bid-pricing tools may have more, less, or difference columns than those shown in FIG. 3.

Illustrative Processes

FIGS. 4-7 illustrate various processes related to bid optimization. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems.

Figure 4:
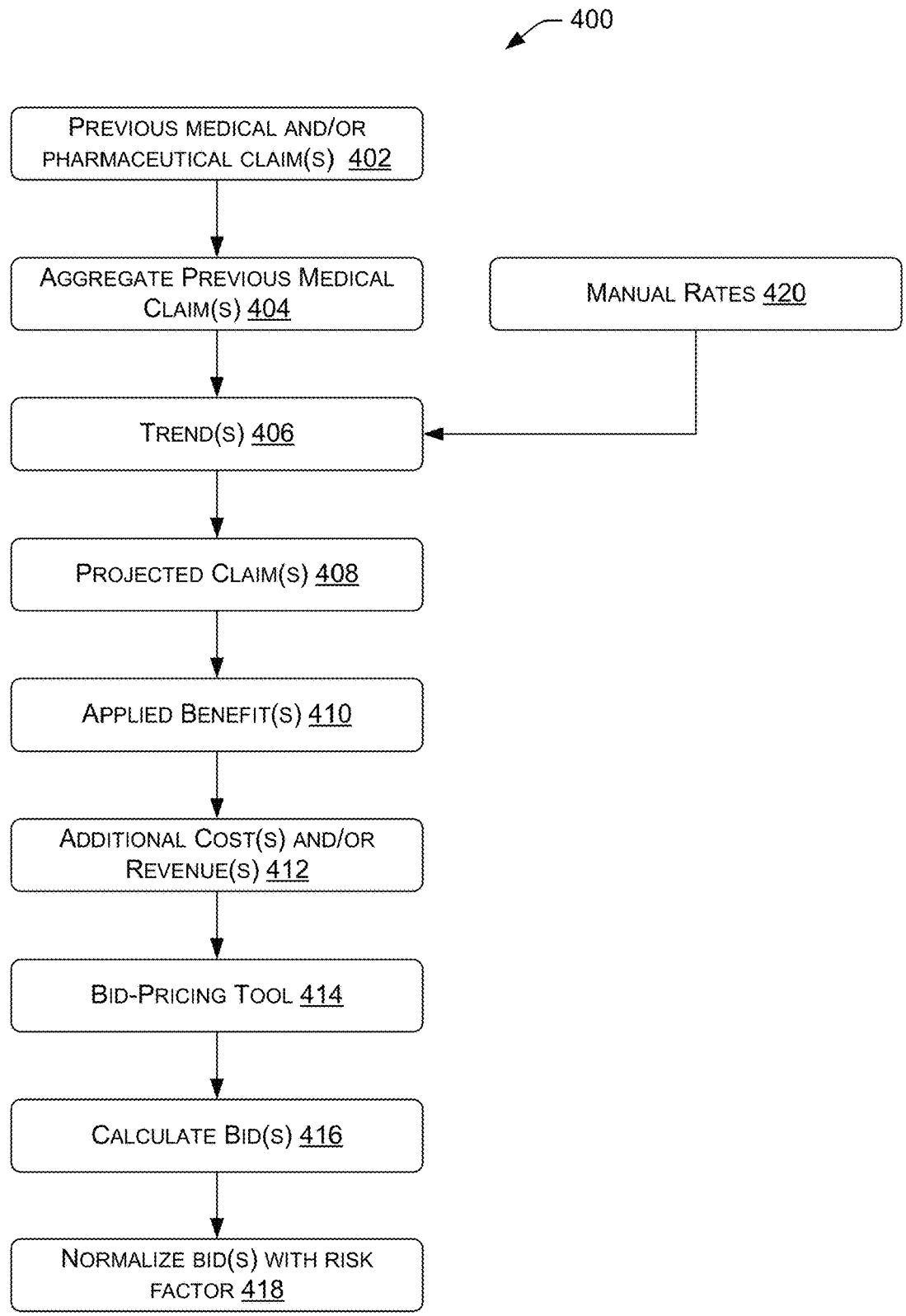
FIGS. 4-7 illustrate various processes for optimizing components of one or more bid(s).

FIG. 4 illustrates an example process 400 for generating a bid. In some instances, the process 400 may be performed by the remote system 102. Beginning at 402, the process 400 may receive and/or obtain previous medical claims and/or pharmaceutical claims, which may correspond to the medical claim 202 and the pharmaceutical claim 204, respectively. In some instances, the previous medical and/or the pharmaceutical claims may be obtained from the source data 124 stored in the memory 120.

At 404, the process 400 may aggregate the previous medical claims. For instance, the previous medical claims may be aggregated according to MA plan, applied benefits offered under previous plans, premiums paid by members of previous plans, and so forth. In some instances, the aggregation component 210 of the remote system 102 may aggregate the previous medical claims. Additionally, in some instances, because of drug coverage tiers, the pharmaceutical claims may not be aggregated at 404.

At 406, the process 400 may receive or determine one or more trend(s). For instance, the trend(s) may relate to the trend(s) 126 about inflation (e.g., inflation 134), provider contracts (e.g., provider contracts 136), utilization (e.g., utilization 138), and so forth. The trend(s) may be determined utilizing the previous medical claims or the pharmaceutical claims and/or the aggregated medical claims at 404. For example, through analyzing the aggregated medical claims, assumptions may be made about an increase in inflation and/or utilization. As an additional example, analyzing the medical claims may indicate an increase in the number of members with heart disease. Such trend analysis may be utilized to make one or more determinations about a MA plan design, such as offering additional screening tests to detect the potential onset of heart disease or offering increased dental coverage. In some instances, the trend(s) may be determined utilizing the machine-learning techniques 132 and/or may be determined by medical professionals.

At 408, the process 400 may receive or determine projected claims. The projected claims may correspond to an amount a MAO expects to pay for an upcoming plan in a contracting year. For instance, as a result of determining the trend(s) at 406, the medical and/or pharmaceutical claims may be determined. In some instances, the machine-learning techniques 132 may determine the projected claims (e.g., projected claim 128) utilizing the trend(s).

At 410, the process 400 may receive or determine applied benefits. The applied benefits (e.g., the applied benefit(s) 130) may correspond benefits offered under a plan design. The applied benefits may include co-pays, screening tests, cost-sharing, and so forth. Here, the applied benefits may depend on a number of members that participated in previous benefits offered under a plan design. For instance, the applied benefits may depend on the number of visits, admittances, procedures, and/or prescriptions that were filled (e.g., columns 312 and 314). Here, values associated with the applied benefits, such as co-pays, may reflect how much members of the plan pay and/or how much MAO pay out under the plan design. For instance, if a plan offers certain screen screening test, dental care, or certain primary care provider (PCP) co-pays, such variables may be considered as an applied benefit under the plan.

At 412, the process 400 may receive or determine additional costs that are part of the bid and/or which are to be factored into calculating the bid. For instance, additional costs may include budgeted expenditures, such as a payroll for employees of the MAO, the amount of support received from the CMS, and/or the amount of claims to be paid by members of the plan. The amount of support received from the CMS may represent premiums paid by the CMS as modified by a RAF, or the risk of the beneficiaries the plans enroll.

At 414, the process 400 may input the components into a bid-pricing tool. For instance, the trend(s), projected claim(s), applied benefit(s), and/or additional costs and/or revenue may be inputted into the bid-pricing tool 140. In some instances, the machine-learning techniques 132 may utilize the components of the bid to automatically populate the bid-pricing tool. That is, instead of having to manually enter the values into the bid-pricing tool at 414, the machine-learning techniques 132 may populate the bid-pricing tool utilizing the components of the bid.

At 416, the process 400 may calculate a bid. For instance, the bid-pricing tool may calculate a bid (e.g., bid(s) 116) corresponding to a set of components or assumptions about the components provided in the process 400. In some instances, the bid may represent a cost sharing or a share of claims to be covered by the MAO, additional costs, a profit margin, an amount of support received by the CMS, as well as the premium paid by members enrolled in the plan. Here, this bid may be submitted to the CMS for review and approval. As noted above, and discussed throughout, given that the bid generated at 418 is dependent upon a variety of components, there is a need to optimize these components. That is, there is a need to optimize the cost sharing, profit margins, the CMS revenue, and premiums paid by members under a plan design. Accordingly, it is at least the machine-learning techniques 132 discussed herein that allow for multiple iterations and assumptions about components to be calculated when determining an optimized bid. At 418, the process 400 may normalize the bid with the RAF. As discussed above, the RAF may represent a relative measure of the probable costs to meet the needs of the member. Here, the RAF may adjust the bid for a member's predicted level of risk. For members of the MA plan, the RAF may be calculated or projected using historical data associated with the medical care and/or expenses for the members.

As a result of calculating the bid, or the normalized bid, in some instances, the results of the bid(s) or components of the bid may be utilized for other purposes. For instance, the components of the bid may be utilized in marketing tools, such as indicating premiums, co-pays, benefits, and so forth offered under the plan.

Additionally, as also illustrated in FIG. 4, in some instances, previous medical claims and/or pharmaceutical claims may be unavailable. For instance, MAO may determine whether to offer a MA plan in a new geographical area (e.g., county). Here, because the MAO has not previously offered plan designs in the geographical area, the MAO may not have access to the source data 124 for purposes of projecting assumptions about components of the bid. Instead, the MAO may utilize data obtained from third-party database(s) (e.g., third-party database(s) 214) to determine manual rates (e.g., the manual rates 216). In these instances, at 418 the process 400 may receive and/or determine manual rates. For instance, the machine-learning techniques 132 may access the third-party databases and determine claims or rates to be used in calculating the bid. For instance, the third-party databases may be used to determine information associated with plans offered in the geographical area. From 420, the process 400 may continue to 406, where the trend(s) are determined and the process 400 may continue to 416 to generate the bid. Again, as the MAO may determine whether to offer a MA plan in a new geographical area, the process 400 may perform scenarios in parallel to model MA plans and bids, thereby optimizing a set of assumptions and offerings under the plan design.

Figure 5:
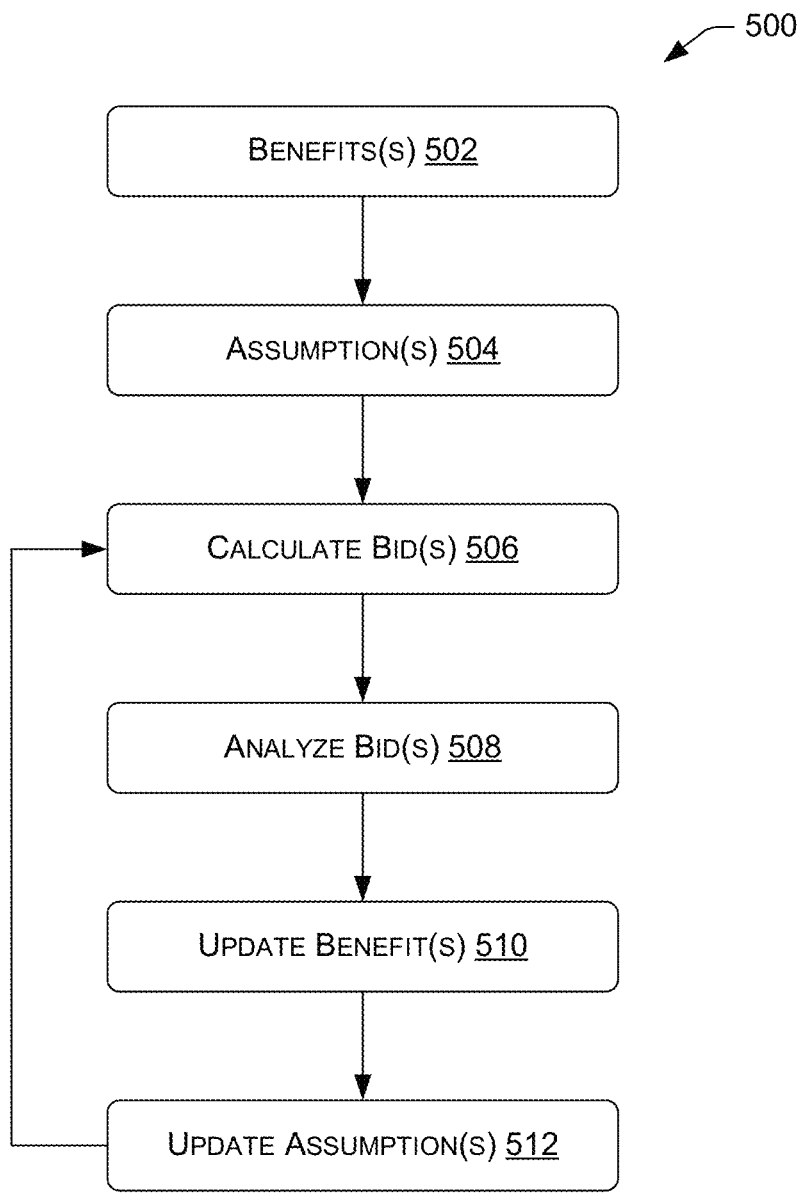

FIG. 5 illustrates a process 500 for iteratively testing assumptions for a bid. In some instances, the process 500 may be performed by the remote system 102 utilizing the analytics component 122, the machine-learning techniques 132, and/or the bid-pricing tool 140.

At 502, the process 500 may receive and/or determine applied benefits under a MA plan. The applied benefits may represent benefits (e.g., copays, screening tests, certain coverage) under a MA plan.

At 504, the process 500 may receive and/or determine assumptions corresponding to components of a bid. For instance, using the benefits from 502, the assumptions may relate to inflation (e.g., the inflation 134), an inflation increase in the amount of members enrolled in a MA plan design, utilization (e.g., the utilization 138), and so forth. As an example, assumptions may include a 5% increase in inflation and a 2% increase in utilization. Additionally, in some instances, the assumptions may relate to a range of values (e.g., utilization between 1% and 2% at 0.01% increments)

At 506, the process 500 may calculate bid(s). For instance, the processor(s) 118 of the remote system 102 may utilize the machine-learning techniques 132 and the assumptions from 504 to calculate a bid using the bid-pricing tool 140. Additionally, in instances where the assumptions are associated with a range of values or a predetermined set of assumptions, bid(s) may be calculated for each value. In some instances, these bid(s) may be calculated in parallel.

At 508, the process 500 may analyze the results of the bid(s). Analyzing the bid(s) may involve analyzing a share of claims covered by the MAO, profit margins, the CMS revenues, and/or member premiums to determine whether such parameters are within an acceptable or preferred range. For instance, if a bid is calculated at 5% increase in inflation and 2% increase in utilization, the premium (e.g., the premium 212) paid by the members of the plan may be too high. Such analysis may therefore be utilized for optimize bid assumptions and recalculate bid under a different set of assumptions. In other words, through analyzing the bid, determinations may be made about components of the bid, which in turn may assist in optimizing components of that bid, such as applied benefits, for instance.

At 510, the process 500 may update the applied benefit(s). For instance, the machine-learning techniques 132 may update applied benefits to include greater co-pays to be paid by members of the plan or offer additional dental coverage. Here, for instance, greater co-pays may represent that the MA plan will cover less of the cost of services. In some instances, this may result in members utilizing fewer services (given the increased co-pays).

At 512, the process 500 may update the assumption(s). For instance, updating assumption(s) may relate to increasing a risk adjustment factor (RAF), increasing a rating of the plan, altering utilization, principium, and/or post-discharge programs.

From 512, the process 500 may loop back to 506 where the bid is calculated using the bid-pricing tool 140. As a result, the new calculated bid may be analyzed for comparison to previously calculated bids to optimize assumptions of the bid components. For instance, the updated benefits and updated assumptions may generate a bid that includes acceptable member premiums and/or acceptable cost sharing between the MAO and the member.

Accordingly, the process 500 may be utilized to iteratively change the assumptions about components of the bid. In other words, through the machine-learning techniques 132, it is possible to test a plurality of combination of benefit(s) and/or assumptions associated with the bid. In some instances, the machine-learning techniques 132 may analyze the bid(s) 116 and automatically re-calculate one or more bid(s) using a difference set of updated benefits and/or assumptions.

Moreover, in some instances, the set of assumptions may be calculated in parallel to observe impacts on the bid in real-time. For instance, it may be determined that the inflation has a large impact on revenue and through calculating bids for a range of inflation values, the effect on the bid may be observed. The optimized assumptions may then be used to populate the bid-pricing tool for submittal to the CMS. Moreover, the process 500 permits the trend(s) and/or the applied benefit(s), for instance, to be dynamically changed to observe impacts on the bid. As such, the optimized inflation may be determined which may be utilized to limit a number of enrolled members in the plan, renegotiate provider contracts, and so forth. Renegotiating provider contracts may include an attempt to lower service costs for certain procedures, which may in turn increase revenue(s) and/or decrease premiums.

Figure 6:
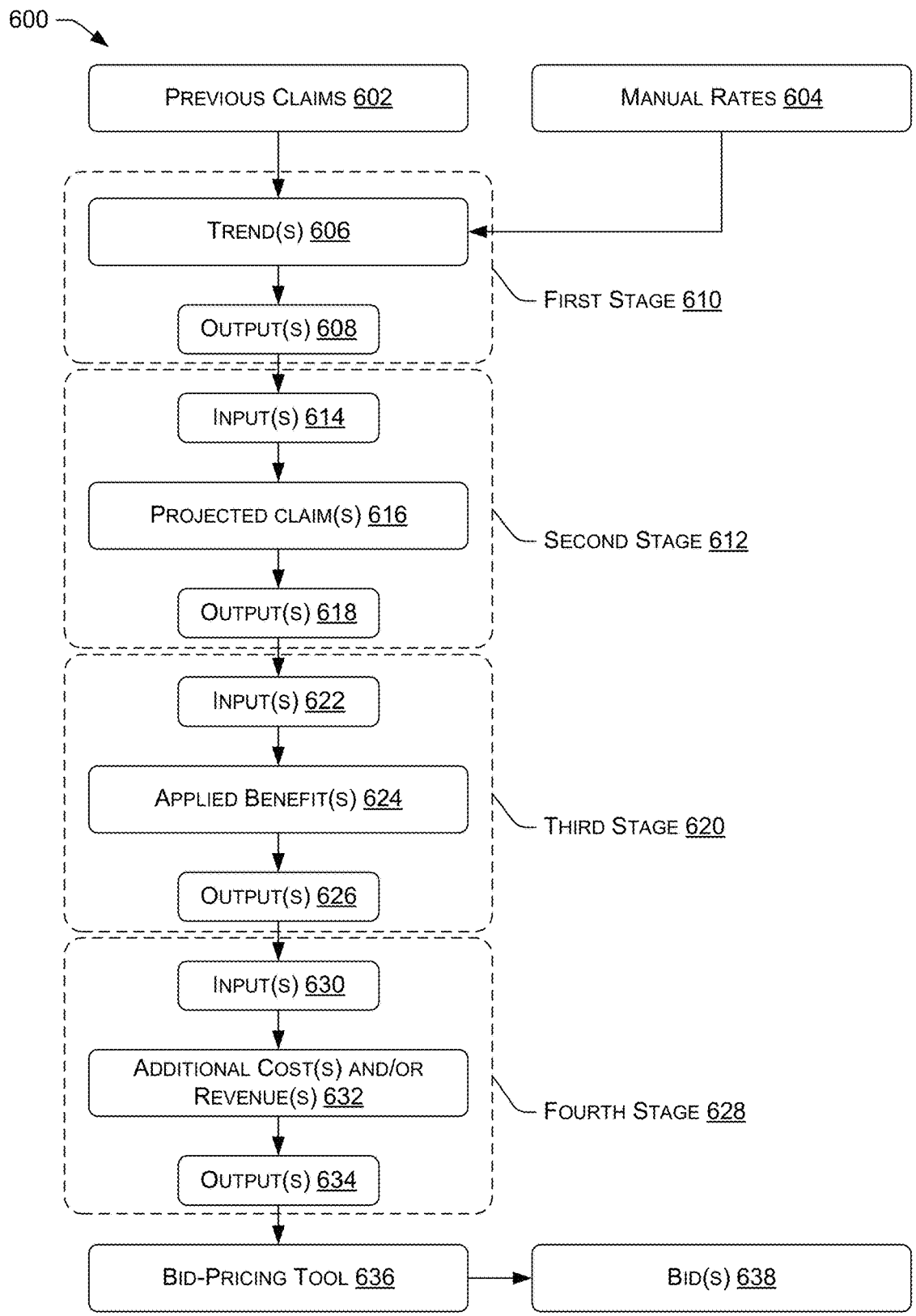

FIG. 6 illustrates an example process 600 for compartmentalizing stages of the bid generation process. At 602, the process 600 may determine or receive previous claims, such as previous medical claims (e.g., the medical claim 202) and/or previous pharmaceutical claims (e.g., the pharmaceutical claims 204). In instances where the process 600 receives previous medical claims, the medical claims may be aggregated.

Alternatively, in some instances, previous medical claims may not be available, such as when a MAO is designing a plan for a new geographical area. In such instances, at 604, the process 600 may determine manual rates for the bid. In some instances, the manual rates may be determined utilizing one or more third-party database(s) (e.g., third-party databases 214).

At 606, the process 600 may determine trend(s) associated with the previous claims (from 602) or the manual rates (from 604). For instance, the process 600 may involve analyzing the previous claims and determining one or more trend(s) associated with inflation, provider contracts, utilization management, and the like. As an example, the machine-learning techniques 132 may project, based at least in part on analyzing the previous medical claims, that inflation may increase 2%.

At 608, the process 608 may produce output(s) as a result of the trend(s). For instance, the output(s) at 608 may relate to the trend(s) determined at 606. Collectively, the trend(s) at 606 and the output(s) at 608 may correspond to a first stage 610. Here, at the first stage 610, the trend(s) (e.g., the trends 126) may be determined.

From the first stage 610, the process 600 may continue to a second stage 612. At 614, the process 600 may receive, as input(s), the output(s) from 608. In other words, the output(s) from one stage of the bid generation process may serve as input(s) to a subsequent stage in the process 600. That is, the input(s) at 614 may serve as input(s) to determine projected claims at 616. In determining the projected claims(s) at 616, the process 600 may produce output(s) at 618, where the output(s) correspond to projected claim(s) (e.g., the projected claim 128).

From the second stage 612, the process 600 may continue to a third stage 620 where the output(s) from 618 corresponding to the projected claims serve as input(s) at 622. Utilizing the input(s) from 622, the process 600 may determine applied benefit(s) at 624. Through determining the applied benefit(s) at 624, the process 600 may produce output(s) at 626.

After the third stage 620, the process 600 may continue to a fourth stage 628 where the output(s) from 626 correspond to input(s) at 630. Utilizing these input(s), the process 600 may determine additional cost(s) and/or revenue(s) at 632. Therein, the process 600 may produce output(s) at 634 for the fourth stage 628.

From 634, the process 600 may proceed to 636 where the output(s) may be input into a bid-pricing tool. Therein, at 638, the bid(s) may be generated.

As a result of compartmentalizing the process 600 into stages (i.e., the second stage 610), the output(s) (e.g., 618) from each of the stages may be verified before being inputted as input(s) (e.g., the input(s) 622) into a subsequent stage (e.g., the third stage 620). In some instances, this may allow for the output(s) to be verified as falling within an acceptable range or threshold level before being inputted into a subsequent stage. As a result, errors in the process 600, such as when projected claim(s) fall outside an acceptable level, may be located within the process 600. This process is compared to realizing an error in the bid(s) (e.g., at 638) after the entire bid generation process has been performed. The compartmentalization of the process 600 into stages may therefore allow for an early detection of errors within the bid(s).

To illustrate an example situation, output(s) 618 may indicate that the projected claims are higher that a threshold level. For instance, the threshold level may be a percentage of projected claims associated with a previous base year/plan. Instead of the output(s) 618 serving as input(s) 622, thereby potentially miscalculating a bid, the output(s) 618 may be flagged for review. As a result of the review, the output(s) 618 may be deemed unacceptable given that the projected claim(s) are higher than the threshold level. In some instances, this error or unacceptable level may result from an improper assumption about the trend(s) at 606.

Accordingly, because the potential error is flagged early in the process 600, as compared to calculating the bid using the potentially unacceptable output(s) at 618, the process 600 may save computing resources through preventing bid(s) from being calculated using the potential error(s).

Figure 7:
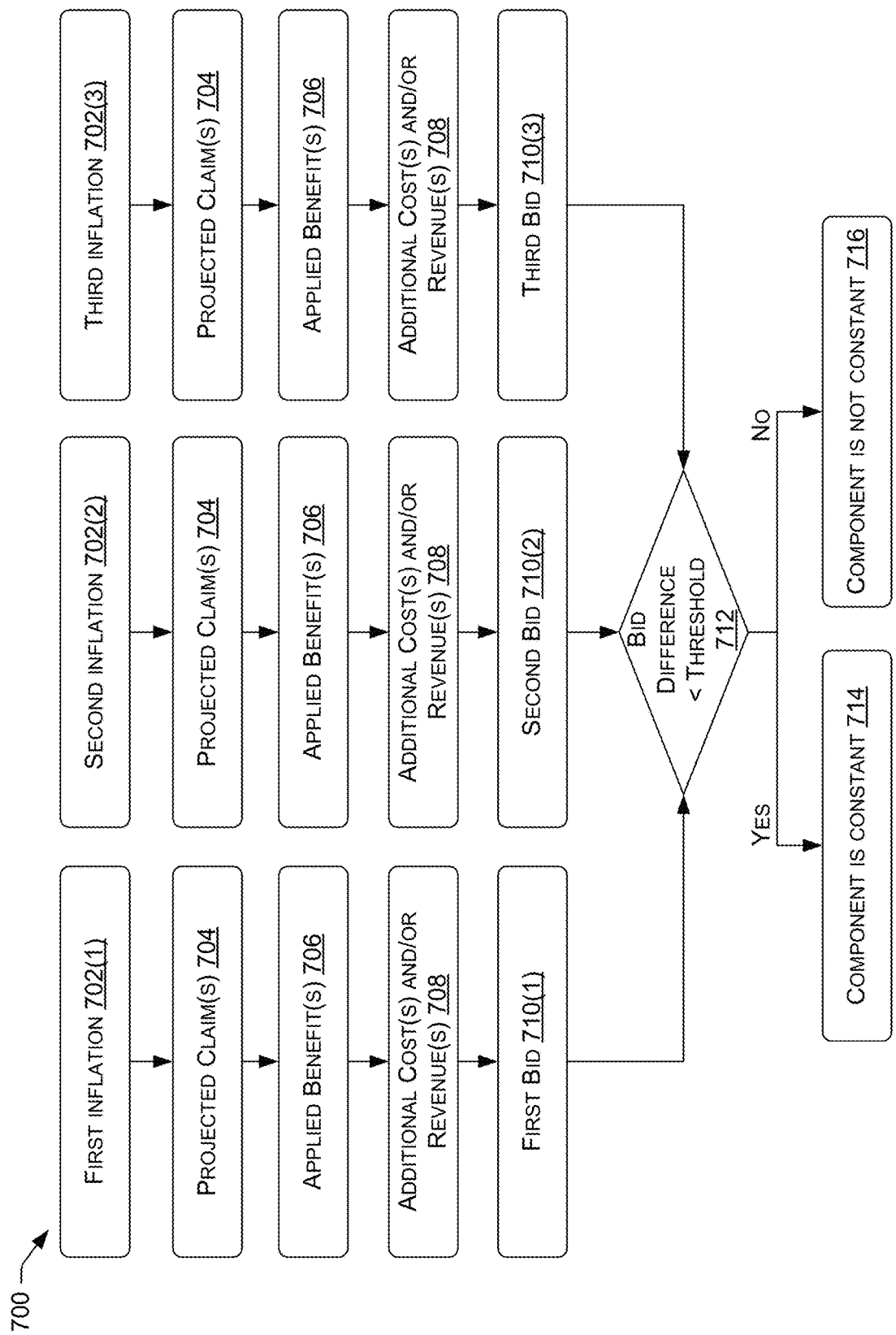

FIG. 7 illustrates an example process 700 for determining multiple bids in parallel. For instance, in optimizing bid(s) and varying assumptions about components of the bid across a range of values, bid differences may be determined. In some instances, the process 700 may be utilized to determine those components of the bid that have an effect on the bid. For instance, the process 700 indicates a first inflation 702(1), a second inflation 702(2), and a third inflation 702(3) (collectively, the "inflations 702"). The inflations 702 may correspond to different assumptions about the inflation component of the bid. For instance, the first inflation 702(1) may be 1.1%, the second inflation 702(2) may be 1.3%, and the third inflation 702(3) may be 1.5%.

At 704, the process 700 may determine projected claim(s). At 706, the process 700 may determine applied benefit(s) under the plan, and at 708, the process 700 may determine additional cost(s) and/or revenue(s). Therein, at 710(1) a first bid may be calculated, at 710(2) a second bid may be calculated, and at 710(3) a third bid may be calculated (collectively, "the bids 710"). The first bid 710(1) may correspond to the first inflation 702(1), the second bid 710(2) may correspond to the second inflation 702(2), and the third bid 710(3) may correspond to the third inflation 710(3).

As illustrated by the process 700, the bids 710 may be calculated through varying certain components, such as the inflation, while keeping other components of the bid constant between the bids 710. That is, the projected claim(s), the applied benefit(s), and/or the additional costs(s) and/or revenue(s) 708 may remain constant across the generations of the bids 710 for the first inflation 702(1), the second inflation 702(2), and the third inflation 702(3), respectively. Additionally, the first bid 710(1), the second bid 710(2), and/or the third bid 710(3) may be normalized with RAF for the members of the plan to adjust the respective bid(s). These RAF may adjust member premiums under the MA plan design.

At 712, the process 700 may determine a bid difference between the bids 710 and determine whether the bid difference is less than a threshold. That is, a difference in revenue, profit margin, and/or premiums may be determined between the first bid 710(1), the second bid 710(2), and/or the third bid 710(3). For instance, the revenues associated with the bids 710 may be compared against one another. In other instances, the bid difference may represent a difference in premiums offered under the respective MA plans.

At 714, as a result of determining that the bid difference is less than the threshold, the process 700 may determine that the component is constant. That is, because the inflations 702 (e.g., the first inflation 702(1), the second inflation 702(2), and the third inflation 702(3)) produce bids 710 having a bid difference less than the threshold, the inflation component of the bid may be determined to not impact the bid. Accordingly, computing resources may be saved when optimizing bids through not factoring or utilizing the inflation when testing different assumptions for the bid components.

At 716, as a result of determining that the bid difference is not less than the threshold, the process 700 may determine that the component is not a constant. That is, because the inflations 702 may produce divergent bids 710, respectively, this component of the bid may be important when optimizing bid assumptions. As such, this component may be considered when generating bids.

However, while FIG. 7 illustrates one changing component (i.e., the inflation), it is to be understood that multiple assumptions may be tested in parallel to determine bid differences therebetween.

CONCLUSION

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
computer-readable media storing computer-executable instructions that, when executed by the one or more processors, cause the one or more processors to perform operations comprising:
analyzing one or more of a medical claims history or a pharmaceutical claims history;
determining components of a first bid for a healthcare plan, wherein the components of the first bid are utilized by a bid-pricing tool to calculate the first bid, and wherein the components of the first bid include:
first trend data representing a first inflation rate associated with a projected increase in members of the healthcare plan;
second trend data representing monetary values for performing care associated with first provider contracts;
third trend data representing a first utilization value associated with one or more services of the healthcare plan;
claim data representing projected claims associated with at least a portion of the members associated with the healthcare plan;
benefits data representing applied benefits associated with the one or more services of the healthcare plan; and
a first risk score representing projected risk scores of the members associated with the healthcare plan; determining components of a second bid for the healthcare plan, wherein the components of the second bid are utilized by the bid-pricing tool to calculate the second bid, and wherein the components of the second bid include at least;
fourth trend data representing a second inflation rate associated with the projected increase in the members of the healthcare plan;
fifth trend data representing monetary values for performing care associated with second provider contracts;
sixth trend data representing a second utilization value associated with the one or more services of the healthcare plan;

the claim data representing projected claims associated with at least the portion of the members associated with the healthcare plan;

the benefits data representing applied benefits associated with the one or more services of the healthcare plan; and a second risk score representing projected risk scores of the members associated with the healthcare plan;

generating a machine learning model configured to determine bid components that affect bids for healthcare plans;

generating an input dataset that includes the first trend data, the second trend data, the third trend data, the claim data, the benefits data, the first risk score, the fourth trend data, the fifth trend data, the sixth trend data, and the second risk score, such that a validated machine learning model is generated;

generating, by the bid-pricing tool and utilizing the validated machine learning model:

a first monetary value associated with first bid based at least in part on the components of the first bid; and a second monetary value associated with the second bid based at least in part on the components of the second bid;

determining a bid difference between the first monetary value of the first bid and the second monetary value of the second bid; and determining, utilizing the validated machine learning model, components of a third bid for the healthcare plan, wherein the components of the third bid are utilized by the bid-pricing tool to calculate the third bid.

2. The system as recited in claim 1, wherein:

the benefits data of the first bid comprises first applied benefits associated with the one or more services of the healthcare plan; and the benefits data of the second bid comprises second applied benefits associated with the one or more services of the healthcare plan, wherein the second applied benefits are different than the first applied benefits.

3. The system as recited in claim 1, wherein:

the first monetary value associated with the first bid comprises a first premium paid by the members of the healthcare plan;

the second monetary value associated with the second bid comprises a second premium paid by the members of the healthcare plan; and the bid difference comprises a difference between the first premium and the second premium.

4. The system as recited in claim 1, further comprising determining that the bid difference is greater than a threshold difference, and wherein determining the components of the third bid are based at least in part on the determining that that the bid difference is greater than the threshold difference.

5. The system as recited in claim 1, wherein at least one of one or more of the components of the first bid or one or more components of the second bid are based at least in part on the analyzing one or more of the medical claims history or the pharmaceutical claims history.

6. A method implemented at least in part by machine-learning techniques, the method comprising:

determining a first bid for a healthcare plan using a validated machine learning model and based at least in part on a bid-pricing tool, wherein the bid-pricing tool is configured to utilize one or more first components to determine the first bid, the validated machine learning model validated utilizing a dataset indicating a range of values representing a projected inflation rate, a range of values representing a projected utilization rate, and a range of projected benefits;

determining a second bid for the healthcare plan using the validated machine learning model and based at least in part on the bid-pricing tool, wherein the bid-pricing tool is configured to utilize one or more second components to determine the second bid, and wherein the first bid and the second bid are determined in parallel;

determining a first bid difference between the first bid and the second bid, wherein the bid difference includes at least a monetary difference in premiums paid by members of the first bid for the healthcare plan and members of the second bid for the healthcare plan;

determining, utilizing the validated machine learning model, one or more third components based at least in part on the bid difference;

determining a third bid for the healthcare plan using the validated machine learning model and based at least in part on the bid-pricing tool, wherein the bid-pricing tool is configured to utilize the one or more third components to determine the third bid; and determining a second bid difference between at least one of: the first bid and the third bid; or the second bid and the third bid.

7. The method as recited in claim 6, wherein:

at least one first component of the one or more first components is the same as at least one first component of the one or more second components; and at least one second component of the one or more first components is different than at least one second component of the one or more second components.

8. The method as recited in claim 6, wherein the first bid comprises one or more first bids and the second bid comprises one or more second bids, the method further comprising:

varying one or more of the one or more first components over a first range of values, wherein the validated machine learning model is configured to utilize the first range of values to determine the one or more first bids; and varying one or more of the one or more second components over a second range of values, wherein the validated machine learning model is configured to utilize the second range of values to determine the one or more second bids.

9. The method as recited in claim 8, further comprising:

comparing at least one of the one or more first bids with at least one of the one or second bids; and determining, based at least in part on comparing the at least one of the one or more first bids with the at least one of the one or second bids, that at least one of the one or more first components effects the one or more first bids less than a threshold amount, and wherein the one or more third components are determined based at least in part on the at least one of the one or more first components effecting the one or more first bids less than the threshold amount, the one or more third components including less components than the one or more first components.

10. The method as recited in claim 6, wherein the one or more first components, the one or more second components, or the one or more third components comprise at least one of:

a projected inflation rate of members of the healthcare plan;

a projected utilization rate of the one or more services of the healthcare plan;

a projected monetary value for performing care associated with at least one of the one or more services;

projected medical claims associated with at least a portion of the members associated with the healthcare plan;

projected pharmaceutical claims associated with at least a portion of the members associated with the healthcare plan; or projected benefits associated with the one or more services.

11. The method as recited in claim 6, wherein:

a first component of the one or more first components is based at least in part on a second component of the one or more first components; and a first component of the one or more second components is based at least in part on a second component of the one or more second components.

12. The method as recited in claim 11, further comprising:

determining that the first component of the one or more first components is within a first predefined threshold; and determining that the second component of the one or more second components is within a second predefined threshold, and wherein:

determining the first bid is based at least in part on the first component of the one or more first components being within the first predefined threshold; and determining the second bid is based at least in part on the second component of the one or more second components being within the second predefined threshold.

* * * * *